United States Patent [19]

Dack et al.

[11] Patent Number: 4,996,695
[45] Date of Patent: Feb. 26, 1991

[54] ARRANGEMENT FOR ACCESSING AND TESTING TELECOMMUNICATION CIRCUITS

[75] Inventors: David G. Dack, Kirkcaldy; Eric P. Huckett, Linlithgow, both of Scotland; David W. Macintosh, Inverkeithing, United Kingdom

[73] Assignee: Hewlett-Packard, Pinewood, Calif.

[21] Appl. No.: 503,129

[22] Filed: Apr. 2, 1990

Related U.S. Application Data

[63] Continuation of Ser. No. 418,925, Oct. 6, 1989, abandoned, which is a continuation of Ser. No. 303,002, Jan. 26, 1989, abandoned, which is a continuation of Ser. No. 177,812, Apr. 8, 1988, abandoned, which is a continuation of Ser. No. 928,225, filed as PCT GB86/00078 on Feb. 17, 1986, published as WO86/05054 on Aug. 28, 1986, abandoned.

[30] Foreign Application Priority Data

Feb. 15, 1985 [GB] United Kingdom ............... 8503924

[51] Int. Cl.⁵ .......................... H04M 3/24; H01J 3/14
[52] U.S. Cl. ........................................ 375/10; 370/13; 379/21; 379/29; 455/67
[58] Field of Search .................. 375/10; 370/14, 16, 370/13; 371/22; 455/67; 379/1, 4, 5, 19, 21, 27, 29

[56] References Cited

U.S. PATENT DOCUMENTS 4,059,729 11/1977 Eddy .............................. 179/15 BF
4,090,035 5/1978 Popkin .......................... 179/15 BD
4,472,798 9/1984 Hafer .................................. 370/14

FOREIGN PATENT DOCUMENTS 0081304 6/1983 European Pat. Off. .

Primary Examiner—Douglas W. Olms
Assistant Examiner—Ralph Smith
Attorney, Agent, or Firm—Karl E. Bring

[57] ABSTRACT

An arrangement is provided for selectively accessing and testing a digital telecommunications circuit (1) without detriment to the integrity of a signal carried thereby. The arrangement comprises an access unit (10) inserted in the circuit (1) to be tested, and test equipment (11) connected to the access unit (10) and through which the circuit to be tested can be selectively routed. The test equipment (11) includes a shift register (24) in its test circuit path. In order to match the delay introduced by the shift register (24) in the test circuit path, a similar clocked delay (21) is included in the access unit in the route followed by the telecommunications circuit (1) when undiverted. This delay matching avoids signal loss or repetition when switching the circuit to be tested between its undiverted and diverted paths. Where the test equipment (1) is used to insert the test data into the diverted circuit, provision is made to avoid the introduction of bipolar-coding violations into bipolar signals carried by the circuit.

8 Claims, 5 Drawing Sheets

ARRANGEMENT FOR ACCESSING AND TESTING TELECOMMUNICATION CIRCUITS

This is a continuation of application Ser. No. 418,925, filed Oct. 6, 1989, now abandoned, which is a continuation of application Ser. No. 303,002, filed Jan. 26, 1989, now abandoned, which is a continuation of application Ser. No. 177,812, filed Apr. 8, 1988, now abandoned, which is a continuation of application Ser. No. 928,225, filed as PCT GB86/00078 on Feb. 17, 1986, published as WO86/05054 on Aug. 28, 1986, now abandoned.

The present invention relates to an arrangement for accessing and testing a digital telecommunications circuit.

It is well known to test a telecommunications circuit both passively by monitoring the signals carried thereby and actively by the injection of test signals into the circuit.

Except in the case of the simplest passive tests, the testing of a telecommunications circuit is generally effected by diverting the circuit through a specialised test instrument; the circuit following a test circuit path therethrough. The process of selectively diverting a circuit through the test instrument may be carried out either by manually plugging the instrument into the circuit or by means of remotely-operated access equipment. Access equipment of this latter type is known which enables any one of several hundred or more circuits to be remotely selected and directed through local test equipment.

The operation of diverting a telecommunications circuit through test equipment may lead to disturbances being introduced into any signal carried by the circuit. In particular, unless appropriate measures are taken to ensure that the signal propagation delay is the same through the undiverted and diverted circuit paths, the delay difference normally present between these paths will result in momentary loss or repetition of a portion of the signal at the moment of changeover between the paths. For digital signals, the delay difference between the undiverted and diverted is usually a result of the presence of clocked register stages in the test equipment causing the diverted signal path through the latter to have a much greater propagation delay than the undiverted path.

U.S. Pat. No. 4,090,035 (Popkin) describes an access module for accessing a digital circuit and directing it through test equipment that includes clocked circuitry test in the circuit path. In order to avoid signal omission or repetition occurring upon a circuit access being made, the access module is provided with an analog delay line arranged to introduce a propagation delay into the undiverted signal path, the magnitude of this delay being such that the propagation delays through the undiverted and diverted circuit paths are equal.

A disadvantage of the arrangement described in the aforesaid US specification is that unlike the delay introduced by the analog delay line, the magnitude of the delay introduced by the clocked stages of the test circuit path is directly proportional to the bit rate of the digital signal being carried by the accessed circuit (the clocking signal being tracted from the digital signal itself). The delay matching of the undiverted and diverted signal paths is thus only accurate for one signal bit rate.

According to the present invention, this problem is overcome by matching the delay in the diverted circuit path with a shift-register delay in the undiverted circuit path, this delay like that in the diverted circuit path being clocked off the digital signal passing along the path. As a result, regardless of the bit rate of the digital signal, the propagation delays through the undiverted and diverted signal paths will remain the same.

More formally stated, according to one aspect of the present invention, there is provided an arrangement for selective accessing and testing a digital telecommunications circuit, said arrangement comprising an access unit through which the said telecommunications circuit is arranged to pass via input and output ports of the unit, test equipment having a test circuit path including N-stage shift register means through which a digital signal passing along the test circuit path is arranged to be self-synchronously clocked, and connection means for providing serial access to said test circuit path from the access unit; said access unit comprising a circuit portion including signal delay circuitry, and switch means for selectively setting the route of the telecommunications circuit between the input and output ports of the access unit, the switch means being settable into a first state in which the telecommunications circuit is routed through the said circuit portion including the delay circuitry, and a second state in which the telecommunicaions circuit is routed, via the connection means, through the test circuit path of the test equipment, characterised in that said delay circuitry is constituted by N-stage shift register means and the access unit further comprises a clock extraction circuit for generating, from an incoming digital signal carried by the telecommunications circuit, a clock signal in synchronism with said incoming signal, the clock signal being fed to the shift register means of the access unit to control the operation of the latter.

Advantageously, the clock signal generated by the clock extraction circuit of the access unit is used not only to clock the shift register means of the access unit, but also to clock the shift register means included in the test circuit path.

Another disadvantage of the arrangement described in the aforesaid U.S. Pat. No. 4,090,035 is the need to terminate the transmission line that constitutes the digital circuit each time the circuit is accessed. In preferred embodiments of the present invention, this disadvantage is overcome by providing the access unit with input and output circuitry for permanently matching the telecommunications circuit characteristics, the switch means being isolated from the telecommunicatons circuit by said input and output circuitry whereby the matching of the telecommunications circuit is unaffected by the operation of the switch means.

The majority of baseband digital telecommunications signals are nowadays subject to bipolar coding in which positive and negative marks are transmitted alternately. Departures from this alternating pattern (that is, two successive marks of the same polarity) are termed violations and indicate the presence of errors (in fact, in most practical coding systems such as HDB3 and B6ZS, deliberate code violations are introduced under certain conditions associated with long strings of zeroes).

In access and test arrangements of the type under consideration, care must be taken to avoid introducing bipolar violations into the signal passing along the telecommunication circuit in cases where the signal has been modified in the test equipment by the insertion of test data. The method described in U.S. Pat. No. 4,090,035 for dealing with this problem involves the corruption of the data carried by digital signal.

In contrast, in a preferred embodiment of the access and test arrangement of the present invention the avoidance of bipolar violations is achieved without data corruption. This is made possible firstly by arranging for the bipolar-encoded signal to be handled within the access unit, as well as in the test equipment, in a two-rail binary format, and secondly by constituting the switch means as a data switch arranged to receive, as inputs, the outputs from the test equipment and from the access-unit shift register means, and to output, towards the output port of the access unit, a selected one of its said inputs, the switch comprising:

input selection means arranged to receive said inputs in tworail binary format and to output the selected signal in the same format on two output lines of the selection means, polarity-reversing means selectively operable to swap over the binary data carried by the two said output lines whereby to effectively reverse the polarity of the selected input, and control means operatively connected both to the selection means to identify thereto the input to select, and to the polarity-reversing means to bring about a polarity reersal where such a revera'sal is required to maintain the bipolar coding integrity of the switch output upon a different input being selected.

Advantageously, the selection means and the polarity-reversing means are jointly constituted by two four-to-one multiplexers each arranged to receive both inputs in two-rail binary format, the multiplexers being connected on their output sides to respective ones of said output lines.

Preferably, the control means includes polarity determining means for determining the setting of the polarity-reversing means appropriate to achieve bipolar coding integrity following the next changeover of the input selection means, the polarity determining means being arranged to carry out this determination by effectively comparing, during the simultaneous presence of marks in both inputs, the polarity of the unselected-input mark with the polarity of the selected-input mark as modified by the polarity-reversing means.

BRIEF DESCRIPTION OF THE DRAWINGS

There now follows a detailed description, which is to be read with reference to the accompanying drawings, of an access and test arrangement for digital trunks; it is to be clearly understood that this access and test arrangement has been selected for description to illustrate the invention by way of example and not by way of limitation.

In the drawings.

DESCRIPTION OF THE PREFERRED EMBODIMENTS

Figure 1:
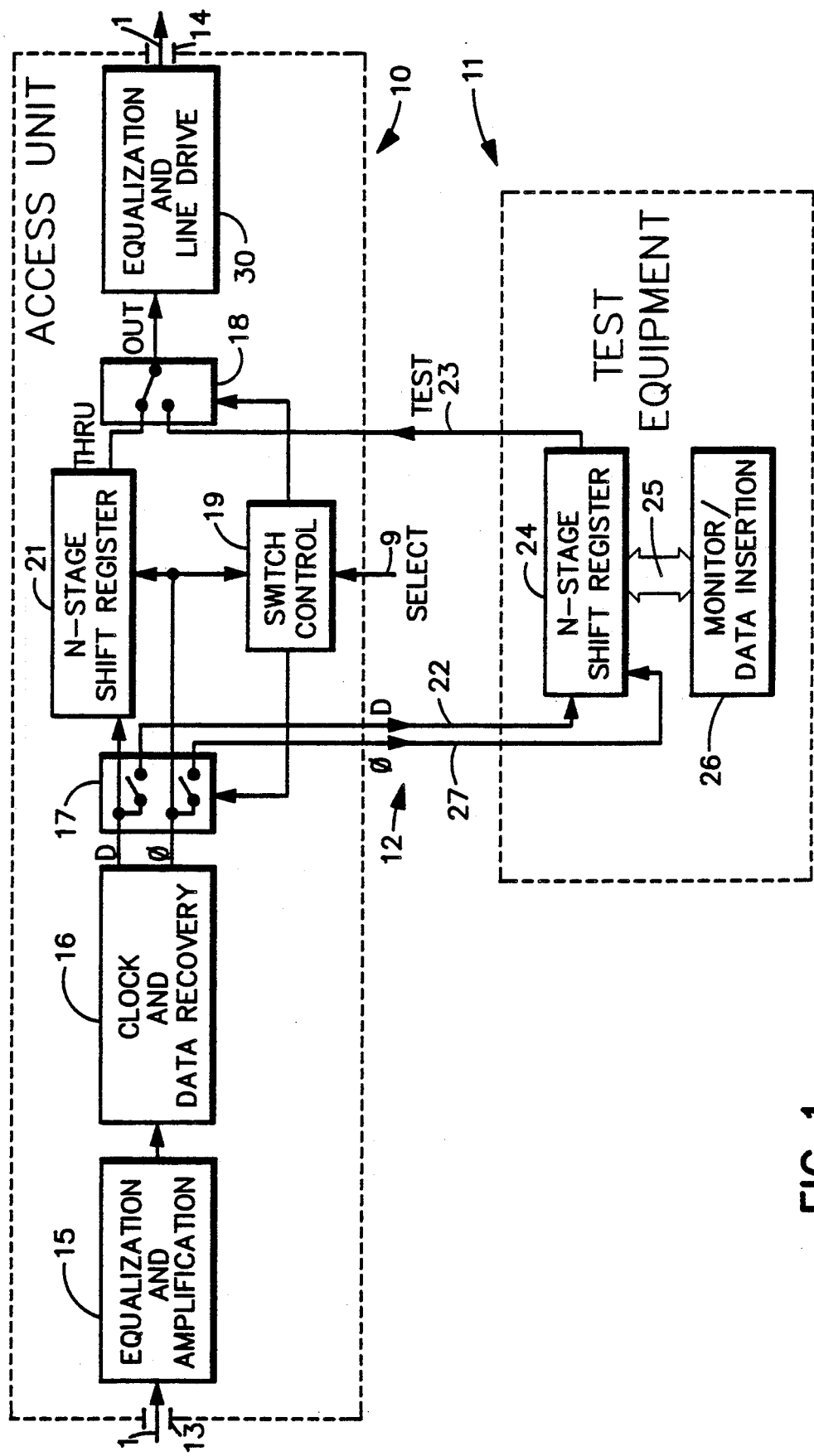
FIG. 1 is a block diagram of the access and test arrangement showing a single access unit and a single item of test equipment.

The arrangement shown in FIG. 1 permits the selective accessing and testing of a digital trunk 1 carrying, for example, a pluratilty of PCM (Pulse Code Modulated) voice channels time division multiplexed together to form a single digital stream. This primary multiplex level stream will typically be at 2.048 Mb/s or 1.544 Mb/s depending on whether the overall telelcommunications system is operating in accordance with the CEPT 30-Channel standard or the Bell 24-channel standard (CCITT Recommendations G.732 and G.733 respectively). The digital stream will generally be in a bipolar encoded format such as AMI (Alternate Mark Inversion) or one of the more sophisticated codings (typically HDB3 or B6ZS).

The FIG. 1 arrangement comprises an access unit 10 inserted in the digital trunk 1, test equipment 11, and connection means 12 providing interconnection between the access unit 10 and the test equipment 11.

The access unit 10 has input and output ports 13,14 respectively which serve to connect the unit into the digital trunk 1. The input port 13 feeds the incoming digital stream to an equalisation and amplification unit 15 which, in turn, passes the digital stream to a clock and data recovery unit 16. The unit 16 serves to extract a timing or clock signal 0 from the digital stream and then uses this signal to regenerate the digital stream. The unit 16 outputs both the regenerated digital stream (data signal D) and the clock signal 0. The data signal D is provided in two-rail binary format, that is, with the positive and negative marks of the bipolar input stream output as binary data on respective lines hereinafter referred to as positive and negative marks lines (for convenience of illustration, the positive and negative mark lines carrying the data signal D have generally been represented in the drawings by a single line). Suitable designs for the units 15 and 16 are well known in the art and these units will not therefore be further described therein.

On the output side of the acess unit 10, an equalisation and line drive unit 30 is provided to interface the access unit 10 with the digital trunk 1. The unit 30 receives an input in two-rail binary format and provides a single bipolar line-driving output. The unit 30, like the units 15 and 16, can be of a design well known in the art and not requiring further elaboration herein.

In a standard digital-trunk regenerator, the data signal D output by the recovery unit 16 would simply be fed direct to the line drive unit 30. However, in the present access unit 10 two possible routes are provided for the data signal D between the units 16 and 30. One of these routes (the 'straight-through' route) takes the data signal D through a circuit portion, including a digital delay 21, within the access unit while the other route (the 'test' route) takes the signal through the test equipment 11.

The route taken by the data signal D is determined by the state of switch means constituted by first and second switches 17, 18 and a switch control unit 19, the state of the switch means being itself determined by a switch-state select signal fed to the control unit 19 on line 9. (It will be appreciated that the switches 17 and 18 are depicted in a highly diagrammatic form in FIG. 1 and would, in practice, be semiconductor switches).

The switch 17 is in fact only required where the test equipment is not dedicated to testing the trunk 1 but is intended to be used for testing a number of different trunks. If the test equipment were dedicated to testing the trunk 1, then the test equipment 11 could be permanently connected to the outputs of the unit 16.

When it is not desired to access the digital trunk 1 for testing, the switch means is set into a first state in which the data signal D passes along its 'straight-through' route via the first switch 17, the digital delay and the second switch 18 on its way to the line drive unit 30.

When is it desired to access the trunk 1 for testing, the switch means is set by the select signal into a second state in which the data signal D passes along its 'test' route via the first switch 17 and a first line pair 22 of the connection means 12 to the test equipment 11, the signal being returned from the equipment 11 to the line drive unit 30 via a second line pair 23 of the connection means 12 and the second switch 18.

The test circuit path along which the data signal D passes through the test equipment 11 when the switch means is in its second state, includes respective N-stage shift registers 24 in the positive and negative mark lines carrying the data signal D. These registers 24 are accessed via a bus 25 by a monitor/data insertion unit 26. The unit 26 is arranged both to read data from, and to write data to, the registers 24. In particular, the unit 26 may be designed to recognise the TDM framing structure of the data signal D whereby to monitor and/or insert test data into a selected channel of the data signal D. The form and construction of the unit 26 will not be further described herein, since not only would suitable circuitry be apparent to persons skilled in the art, but the detailed functioning and construction of the unit forms no part of the present invention.

The digital delay 21 of the access unit 10 is arranged to present the same propagation delay to the data signal D when the switch means is in its first state as does the test equipment 11 and connection means 12 when the switch means is in its second state. This is achieved by constituting the digital delay 21 as two shift registers (one for the positive mark line and one for the negative mark line carrying the data signal D) with each register having the same number of stages N as the registers 24 of the test equipment; furthermore, the registers 21, 24 are arranged to be clocked at the same rate by using the same clocking signal, in this case the signal 0 provided by the unit 16. It is assumed that the propagation delay consequent upon the length of the lines 22,23 is negligible relative to the delay introduced by the registers 24 and can, therefore, be ignored in determining the desired delay to be provided by the digital delay 24.

The clock signal 0 is provided to the registers 24 via a line 27 when the switch 17 is in its second state.

Due to the provision of equal propagation delays in the two possible routes between the switches 17 and 18, provided the operation of these switches is correctly sequenced, it is possible to selectively switch the data signal D between these routes without loss or repetition of portions of the signal.

As regards operation of the switches 17,18, it will be appreciated that following closure of the switch 17 to route the data signal D through the test equipment 11, a period of time equal to the signal propagation delay time through the registers 24 must be allowed to lapse before the switch 18 is changed over to pick up the signal on the line pair 23. Operation of the switch 18 before the elapse of this period will result in a gap in the signal fed to the line drive unit 30; later operation of the switch 18 is, however, acceptable since in the present arrangement the data and clock signals D and 0 are continuously fed to the registers 21 so that the signal D will always be passed to the switch 18.

The possibility of delaying operation of the second switch 18 for a substantial period following operation of the first switch 17 to feed the circuit 1 to the test equipment 11, means that the circuit 1 can be monitored by the test equipment 11 for as long desired before any decision is made to route the circuit 1 wholly through the test equipment.

Control over the relative timing of the operation of the switches 17 and 18 is effected by the switch control unit 19 for which purpose the latter is supplied both with the clock signal from the unit 16 as well as with the switch-state select signal on line 9.

From the earlier discussion on switch timing, it is apparent that the general timing of the operation of the switch 17 is not critical and the switch 17 can therefore be arranged to change state in direct response to the switch-state select signal (though, of course, in practice the precise timing of the switch-over will normally be synchronised with the clock signal 0).

The main timing function of the switch control 19 is thus to ensure that the switch 18 is not changed to its second state to access line pair 23 before a signal has had a chance to appear on this line.

The switch control 19 is also used to carry out a second function, namely of ensuring that the switching between the outputs of the registers 21 and 24 does not result in bipolar violations being introduced into the output data stream. In this respect, it should be noted that since the test equipment 11 may be used to insert arbitrary test data into the signal clocked through the registers 24, there is no guarantee that the two data signals presented to the switch 18 are correlated with respect to bipolar integrity; thus, upon change-over of the switch means the first mark of the newly selected signal may be of the same polarity as the last mark of the previously selected stream. To ensure completely hitless access to the trunk 1, it is therefore necessary not only for the switch means to time the changeover between its two states correctly, but appropriate measures must be taken to avoid introducing bipolar coding violations.

Figure 2:
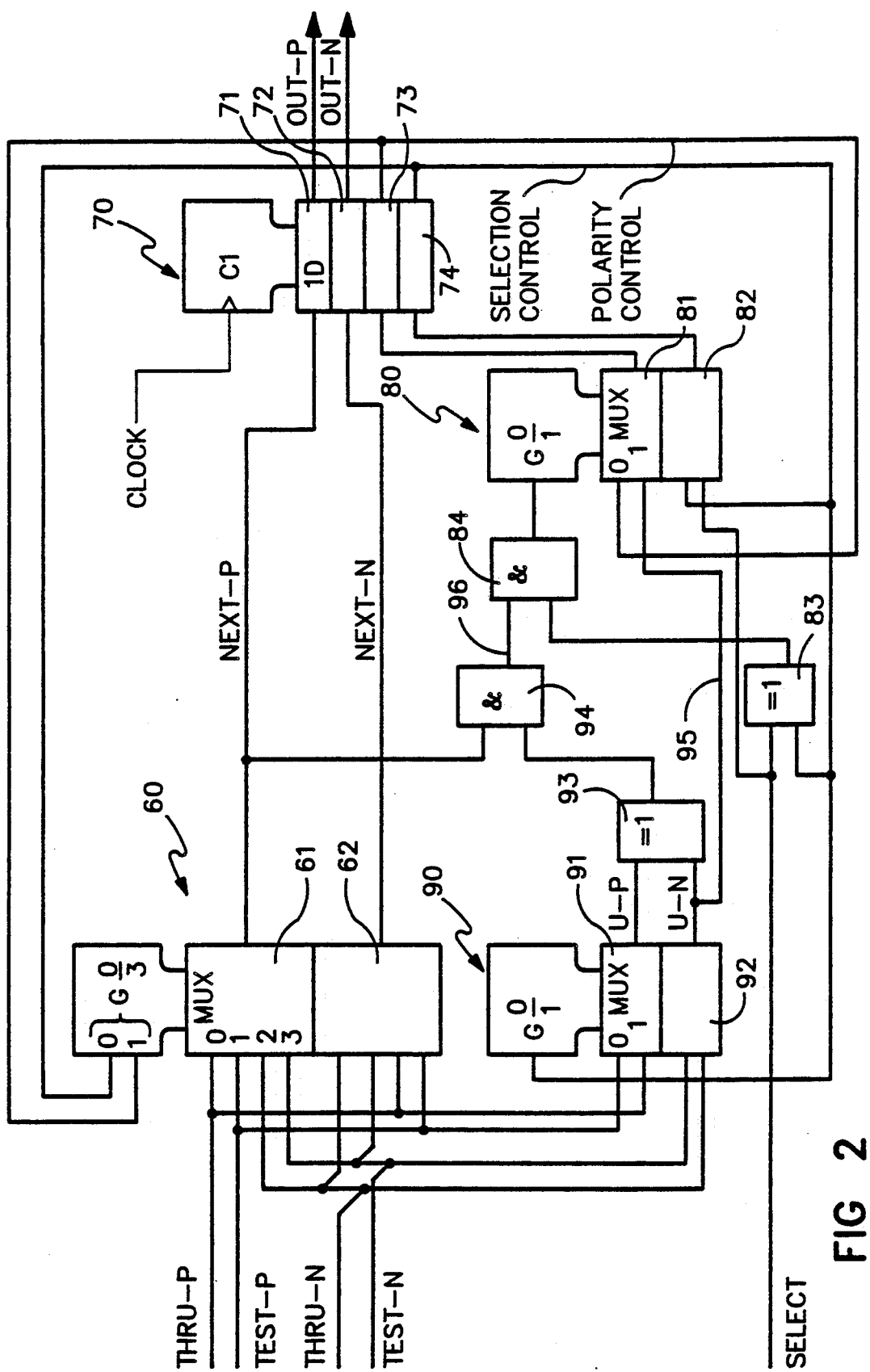
FIG. 2 is a circuit diagram of a data switch utilised in the access unit illustrated in FIG. 1.

FIG. 2 shows a combined implementation of switch 18 and switch control 19 which both ensures that switching does not occur until a signal is present on the line to be switched to, and also avoids introducing bipolar coding violations upon changeover.

The FIG. 2 switch arrangement is connected to receive two bipolar-encoded inputs in two-rail binary format, the inputs being a first data input THRU from the shift registers 21 of the access unit and a second data input TEST from the test equipment 11. The input THRU is made up of a binary positive mark signal THRU-P and a binary negative mark signal THRU-N; similarly the input TEST is made up of a positive mark signal TEST-P and a negative-mark signal TEST-N.

The two data inputs THRU and TEST are fed to switch block 60 where one of the two inputs is selected (in dependence on the signal SELECT) and, if required, subject to polarity reversal by the interchange of the postive and negative mark signals of that input.

The resultant positive and negative mark signals NEXT-amd NEXT-N output from the the switch block 60 are subsequently clocked into respective latches 71,72 of a latch block 70 to provide the positive and negative mark signals OUT-P and OUT-N that constitute the data output OUT of the FIG. 2 switch arrangement. This output is supplied to the input of the equalisation and line drive unit 30 of FIG. 1.

The input-selection and polarity-reversing switch block 60 is constituted by two four-to-one multiplexers 61,62 each of which is arranged to receive all four signals making up the two data inputs THRU and TEST. The output of the multiplexer 61 provides the signal NEXT-P while the output of the multiplexer 62 provides the signal NEXT-N. The operation of the multiplexers 61,62 is controlled by two binary control signals SELECTION CONTROL and POLARITY CONTROL that respectively determine which input is selected and whether or not it is subject to polarity reversal. the following Table sets out for all values of the control signals, which of the input signals are used to constitute the output signals NEXT-P and NEXT-N.

| Control Inputs | | | |
|---|---|---|---|
| Polarity Control | Selection Control | NEXT-P | NEXT-N |
| 0 | 0 | THRU-P | THRU-N |
| 0 | 1 | THRU-N | THRU-P |
| 1 | 0 | TEST-P | TEST-N |
| 1 | 1 | TEST-N | TEST-P |

It will be appreciated that by appropriate setting of the POLARITY CONTROL signal upon a change-over between selected inputs, it is possible to avoid the introduction of bipolar violations at the changeover. Thus, if the last mark of the current output is positive while the first mark of the input next to be selected is also positive, then a violation is avoided by reversing the polarity of the latter once selected.

The SELECTION CONTROL and POLARITY CONTROL signals are supplied to switch block 60 from respective latches 74, 73 of a latch block 70. The state of the SELECTION CONTROL signal is determined by the state of the SELECT signal; however, the state of the SELECT signal cannot be directly clocked into the latch 73 to control the switch block 60 since after a change in state of the SELECT signal, operation of the switch block 60 must be delayed until an assessment has been made as to whether the polarity of the input next to be selected will require reversal in order to maintain bipolar encoding integrity of the output signal OUT. The circuitry used to carry out this assessment will be described in detail hereinafter; for the present, it suffices to note that the results of this assessment are supplied on line 95 as the next required state of the POLARITY CONTROL signal while the presence of a valid signal on line 95 is indicated by a logical 'true' signal on line 96.

Control over the inputs to the polarity-control and selection-control latches 73, 74 is effected by respecitve two-to-one multiplexers 81,82 of a multiplexer block 80. The inputs to the multiplexer 81 are the current state of the polarity control latch 73 and the signal on line 95 indicative, when valid, of the next required state of the POLARITY CONTROL signal. The inputs to the multiplexer 82 are the current state of the selection control latch 73 and the SELECT signal.

Normally, the multiplexers 81, 82 are set to feed the outputs of the latches 73, 74 back to their inputs such that upon each clocking of these latches, the current states of the SELECTION CONTROL and POLARITY CONTROL signals are maintained. However, the multiplexers are arranged to feed new required states of the POLARITY CONTROL and SELECTION CONTROL signals to the latches 73,74 upon the following two conditions being simultaneously satisfied:

(a) the state of the SELECT signal is different from that of the SELECTION CONTROL signal, indicating that a change in selected data input is required; and (b) a valid assessment has been made as to the polarity of the next selected input required to maintain bipolar integrity.

The first of these conditions (a) is tested by an Exclusive OR gate 83 fed with both the SELECT signal and the SELECTION CONTROL signal, any difference between these signals indicating that a different input is to be selected and resulting in a logical 'true' output from the gate 83. The second of the above conditions (b) is indicated by the previously-mentioned signal on line 96. The output of the gate 83 and the signal on line 96 are fed to an AND gate 84 to provide the require AND combination of the above two conditions (a) and (b), the output of gate 84 being used to control the multiplexers 81,82.

The circuitry for asessing the next required state of the POLARITY CONTROL signal comprises a multiplexer block 90, an Exclusive-OR gate 93, and an AND gate 94. The multiplexer block 90 is made up of two two-to-one multiplexers 91,92 respectively fed with the signals THRU-P, TEST-P and the signals THRU-N, TEST-N. The multiplexers 91, 92 are controlled by the SELECTION CONTROL signal such that the multiplexer 91 outputs, as a signal U-P, the positive mark signal of the input unselected by switch block 60 while the multiplexer 92 outputs, as a signal U-N, the negative mark signal of the unselected input.

The signals U-P, U-N are fed to the gate 93, the latter producing a logical true output only when a positive or negative mark (but not both) is present in the unselected input. The signal U-N is also fed to the line 95. The output of gate 93 is fed to the AND gate 94 and is the signal NEXT-P output from the multiplexer 61. The output of gate 94 is connected through the line 96 to gate 84.

The determination of the next required state of the polarity control signal by the circuitry 90, 91,92 is based upon a comparison of the polarity of a mark in the unselected data input with a simultaneously occurring mark in the output of the input-selection and polarity-reversing switch block 60. If these marks are of the same polarity, then change over to the unselected input can be effected without having to reverse the polarity of that input; however, if the marks of of opposite polarity, then polarity reversal with be required. In the present example, rather than considering the polarity of a mark (if any) in the unselected input for both polarities of mark in output from the switch block 60, the polarity of marks in the unselected input are only considered for the positive mark output NEXTP from the switch block 60. With this limitation, it is possible to use the negative mark signal U-N as a direct indication of the next required state of the POLARITY CONTROL signal, polarity reversal (signal state '1' as depicted in the Table given earlier) being only necessary when a negative mark in the unselected input (U-N equals '1') coincides with a positive mark in the output from switch block 60. Of course, the signal U-N only provides a valid assessment of the next required state of the POLARITY CONTROL signal when a positive mark is present in the output from switch block 60 and a mark (either positive or negative, but not both,) is also present in the unselected input; it is for this reason that the gates 93,94 are provided, their connection being such as to generate an appropriate assessment-valid signal on line 96.

From the foregoing, it is clear that following a change in state of the SELECT signal, changeover from one data input to the other is delayed until the next required state of the POLARITY CONTROL signal can be determined, that is, until the next simultaneous occurrence of a positive mark in the switch output and a mark in the unselected input. Upon the occurrence of this mark coincidence, the signals SELECT and U-N are fed to the latches 73,74 and are entered at the next clocking of the latter; at this moment, the switch block 60 changes over between data inputs and effects polarity reversal of the newly selected input if so required.

It will be appreciated that since changeover between data inputs will always be delayed until marks are simultaneously present in both inputs, the previously mentioned timing restriction regarding delayed operation of the switch 18 for a period sufficient to allow a diverted signal to pass through the test equipment, will always be met.

Figure 3:
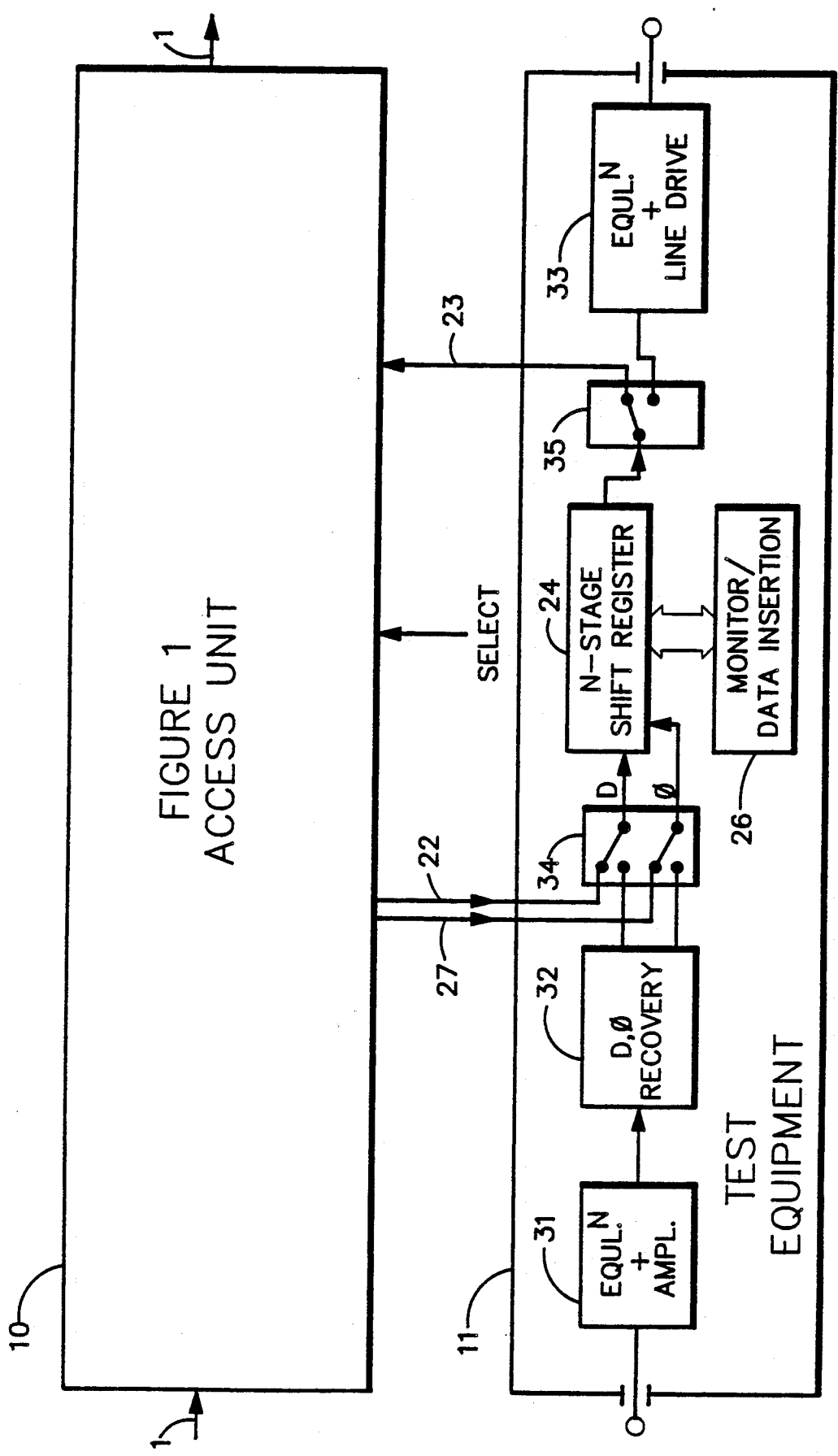
FIG. 3 is a block diagram similar to FIG. 1 but illustrating the use of a stand-alone test instrument as the test equipment of the access and test arrangement.

In FIG. 1 the test equipment 11 is illustrated as being built into the overall access and test arrangement. In fact, the test equipment 11 can be constituted by a stand-alone test instrument temporarily connected into the access and test arrangement. FIG. 3 illustrates a suitable form of test instrument for this role. As can be seen from FIG. 3, the stand-alone instrument 11 is provided in its test circuit path with all the necessary circuitry for interfacing directly with a digital trunk. The test circuit path of the test instrument thus includes an equalisation and amplification unit 31, a clock and data recovery unit 32, an N-stage shift register 24 interfacing with a monitor/data-insertion unit 26, and an equalisation and line drive unit 33.

In addition, the instrument further includes switches 34,35 which permit the instrument to be operated in two modes, namely a first, stand-alone, mode in which the instrument interfaces directly with the trunk 1 with the register being fed with clock and data signals from the clock and data recovery unit 32, and a second mode (illustrated in FIG. 3) in which the registers 24 is arranged to be fed with clock and data signals from the access unit 10. In this second mode, the only delay present in the test circuit path is that introduced by the clocked register 24 which can be readily matched by the registers 21.

In order to permit the access unit 10 to be tested using a number of items of test equipment with differing numbers of stages in their shift-registers 24, the effective number of shift-registers stages N in the straight-through route of the access unit is preferably made adjustable. Conversely, to permit the same item of test equipment to be used with access units having different, fixed, numbers of shift-register stages N, the number of stages of the shift registers 24 can be made adjustable.

Figure 4:
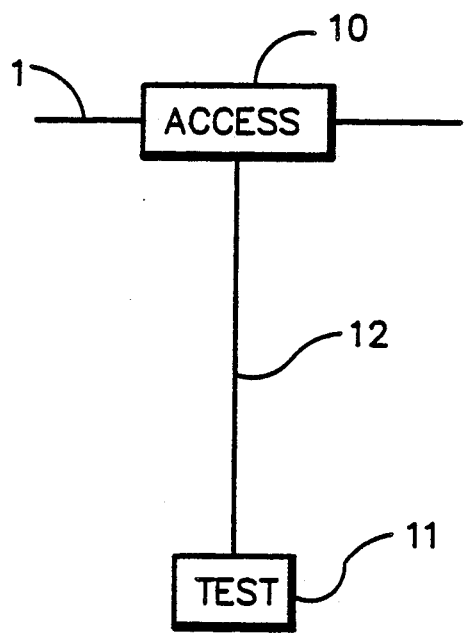
FIG. 4 is a simplified block diagram of the access and test arrangement of FIGS. 1 to 3.

In the versions of the access and test arrangement described above with reference to FIGS. 1 and 3, only a single access unit 10 and a single item of test equipment have been shown. A simplified representation of these versions is given in FIG. 4 which illustrates only the three basic elements of the arrangement namely an access unit 10 inserted in a digital trunk 1, connection means 12, and test equipment 11. As already described, the access unit 10 permits the selective routing of the trunk 1 through the test equipment 11 via the connection means 12.

Since the connection means 12 is left free by the access unit 10 when the latter is not routing the trunk 1 through the test equipment 11, a plurality of access units 10 can be associated with the same connection means 12 and test equipment 11 enabling any one of a plurality of trunk circuits to be selectively routed through the test equipment. Such an arrangement is shown in FIG. 5.

Figures 6, 7:
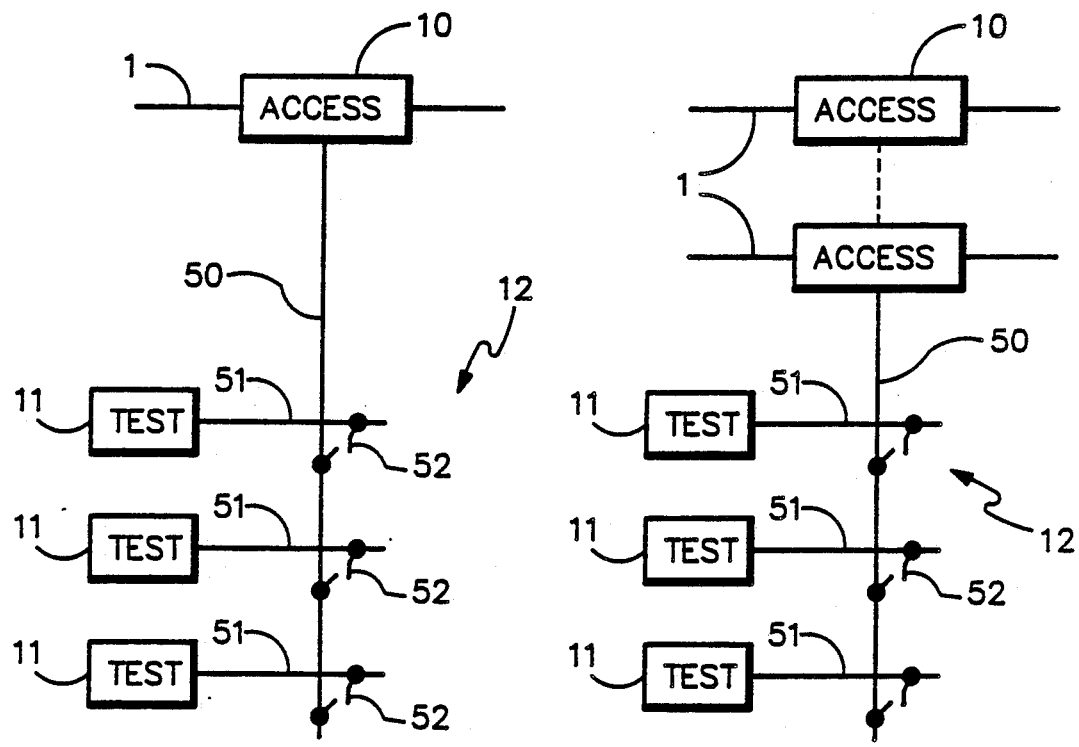
FIG. 6 is a block diagram, in the FIG. 4 format, showing a version of the access and test arrangement having a plurality of items of test equipment.
FIGS. 7 and 8 are block diagrams, in the FIG. 4 format, showing versions of the access and test arrangement having both a plurality of access units and a plurality of items of test equipment.

As is illustrated in FIG. 6 for a single access unit 10, it is also possible to provide a plurality of items of test equipment 11 through any one of which the trunk 1 associated with the unit 10 may be routed. All the items of test equipment 11 have the same propagation delay through their test circuit paths. The routing of the trunk 1 through a particular test instrument requires an appropriate pathway to be pre-set through the connection means. To this end, the connection means 12 comprises a first connection bus 50 running from the access unit 10, second connection buses 51 extending from each item of test equipment 11, and bus switch 52 for selectively connecting the first bus 50 with a desired one of the second buses 51.

Figure 5:
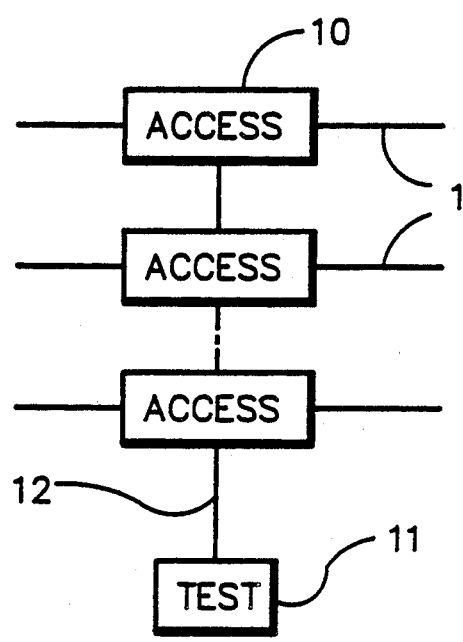
FIG. 5 is a block diagram, in the FIG. 4 format, showing a version of the access and test arrangement having a pluraity of access units.

As is illustrated in FIG. 7, the configurations shown in FIGS. 5 and 6 can be combined with a plurality of access units 10 being arranged to share the first connection bus 50. With such a combined configuration, any one of the trunks 1 can be routed through a selected one of the items of test equipment.

Figure 8:
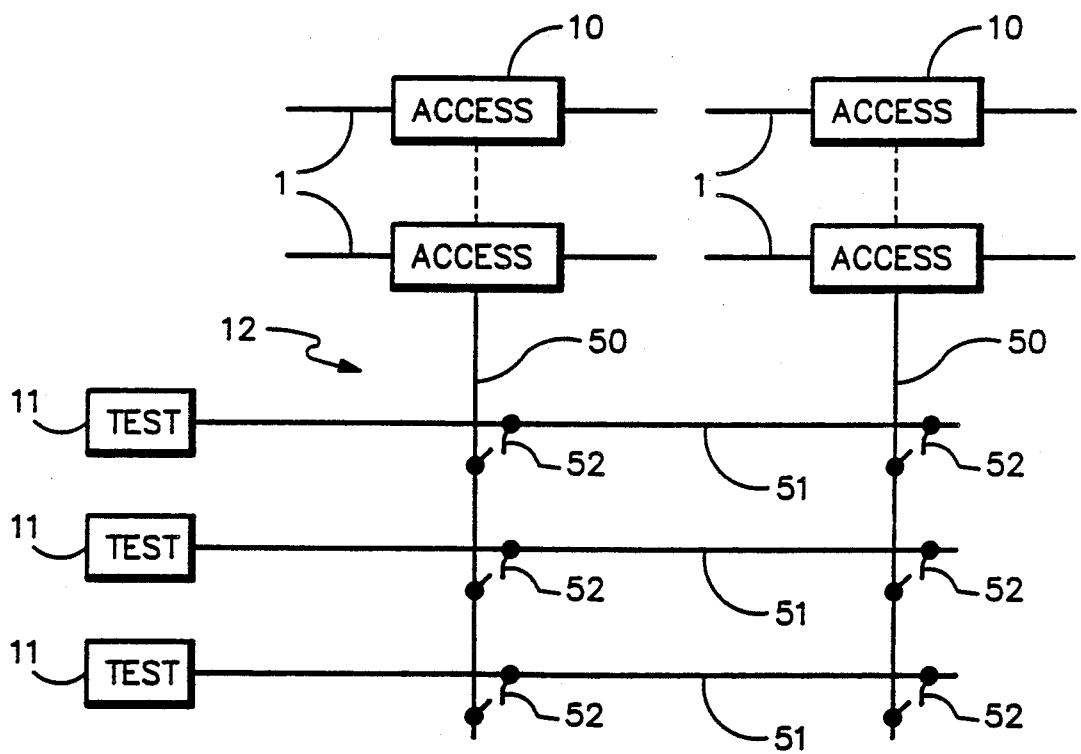

A drawback of the FIG. 7 configuration is that at any one time only one item of test equipment 11 can be in use at any given time. FIG. 8 illustrates a configuration which permits two trunk circuits 1 to be routed through different respective items of test equipment 11 simultaneously. This is achieved by providing two first connection buses 50 with some of the access units 10 being associated with one bus 50 and others with the other bus 50. By suitable setting of the bus switches 52, a trunk 1 associated with with other first bus 50 can be routed through another of the items of test equipment 11.

Although the access and test arrangement has been described above in relation to the selective accessing of a digital trunk carrying a TDM digital stream, the arrangement can, of course also be used to access other digital telecommunications circuits. Furthermore, it will be appreciated that the nature of the data carried by the telecommunication circuit to be accessed is not relevant to the form of the access and test arrangement, thus, this data may, for example, be signalling data, PCM encoded voice channel data, or computer communication control commands and data.

We claim:

1. Apparatus for selectively accessing and testing a digital telecommunications circuit comprising:
   (a) an access unit (10) through which digital telecommunications data is arranged to pass via input and output ports (13,14) of the access unit; and,
   (b) test equipment (11) for coupling to the access unit via a serial communication means (12), the test equipment having a test circuit path including first N-stage shift register means (24) through which the digital telecommunications data is arranged to be self-synchronously clocked when the test equipment is coupled to the access means;

said access unit (10) comprising a circuit portion including second N-stage shift register means (21) and switch means (17,18,19) for selectively setting a route of the digital telecommunications data between the input and output ports (13,14) of the access unit, the switch means (17,18,19) being settable into (i) a first state in which the digital telecommunications data is routed directly from the input port through the second N-stage shift register means (21) and to the output port, and (ii) a second state in which, when the test equipment is coupled to the access unit, the digital telecommunications data is routed from the input port and via the connection means (12) through the test circuit path of the test equipment (11) to the output port, and also through the second N-stage shift register means (21);

the access unit (10) further comprising a clock extraction circuit (16) for generating, from the digital telecommunications data, a clock signal in synchronism with the digital telecommunications data, the clock signal being fed to the second N-stage shift register means (21) of the access unit to clock the digital telecommunications data therethrough, and, when the test equipment is coupled to the access unit and the switch means is set in said second state, the clock signal also being fed to the first N-stage shift register means (24) to clock the digital telecommunications data therethrough;

the test equipment (11) further comprising testing means coupled to the first N-stage shift register means (24) for monitoring and altering digital telecommunications data routed therethrough when the test equipment is coupled to the access unit and the switch means is set in said second state;

the first and second N-stage shift register means (21,24) each imposing a delay of substantially equal duration on digital telecommunications data routed therethrough so that no portion of the digital telecommunications data is lost or repeated when the setting of the switch means is changed between the first and second states.

2. Apparatus according to claim 1, wherein the access unit (10) further comprises input and output circuitry (15,30) for matching electrical characteristics of the telecommunications circuit to electrical characteristics of a transmission line carrying the digital telecommunications data, the switch means (17,18,19) being isolated from the telecommunications circuit by said input and output circuitry (15,30) whereby the matching of the telecommunications circuit (1) to the transmission line is unaffected by the operation of the switch means (17,18,19).

3. Apparatus according to claim 1 wherein the test equipment (11) is removable enabling it to be used for other test purposes, the number of stages of the first N-stage shift register means (24) of the test equipment (11) being adjustable to suit said other test purposes.

4. Apparatus according to claim 1 wherein the digital telecommunications data is a bipolar-encoded signal, said access unit (10) and test equipment (11) being arranged to internally handle said bipolar-encoded signal in two-rail binary format, and the switch means of the access unit (10) comprises a data switch (18,19) arranged to receive as inputs (TEST,THRU) outputs from the test equipment (11) and from the second N-stage shift-register means (21) of the access unit (11) and to output towards the output port (14) of the access unit (10) a selected one of said inputs (TEST, THRU), said data switch (18,19) comprising:

input selection means (60) arranged to receive said inputs (THRU, TEST) in two-rail binary format and to output the selected input in the same format on two output lines of the input selection means, polarity-reversing means (60) selectively operable to effectively reverse the polarity of the selected input, and control means (80,83,84,90,93,94) arranged to receive an input-select signal (SELECT) indicative of the input it is desired to select, the control means being operatively connected both to the input selection means (60) to identify thereto the selected input as determined by said input-select signal, and to the polarity-reversing means (60) to effectively bring about a polarity reversal where such a reversal is required to maintain the bipolar coding integrity of the switch output upon a different said input being selected.

5. Apparatus according to claim 4 wherein the selection means and the polarity-reversing means are jointly constituted by two four-to-one multiplexers (61,61) each arranged to receive both inputs (THRU,TEST) in two-rail binary format, the multiplexers being connected on their output sides to respective ones of said output lines.

6. Apparatus according to claim 4 wherein the control means include polarity determining means (90,93,94) for determining the setting of the polarity-reversing means (60) appropriate to achieve bipolar coding integrity following the next changeover of the input selection means (60), the polarity determining means (90,93,94) being arranged to carry out this determination by effectively comparing, during the simultaneous presence of marks in both inputs, the polarity of the unselected-input mark with the polarity of the selected-input mark as modified by the polarity-reversing means (90,93,94).

7. Apparatus according to claim 6 wherein the mark-polarity comparison effected by the polarity determining means (90,93,94) is carried out by reference to the unselected input during the presence of a mark of known polarty at the output of the input-selection means (60).

8. Apparatus according to claim 6 wherein, following the occurence of the input-select signal indicating that a change of selected input is required, the control means is arranged to delay implementation of the required change until said polarity determining means (90,93,94) has next determined the appropriate setting for the polarity reversing means (60).

* * * * *